No. 870,080. PATENTED NOV. 5, 1907.
C. P. & H. C. BOSTIAN.
TROLLEY WHEEL.
APPLICATION FILED JULY 15, 1907.
2 SHEETS—SHEET 1.
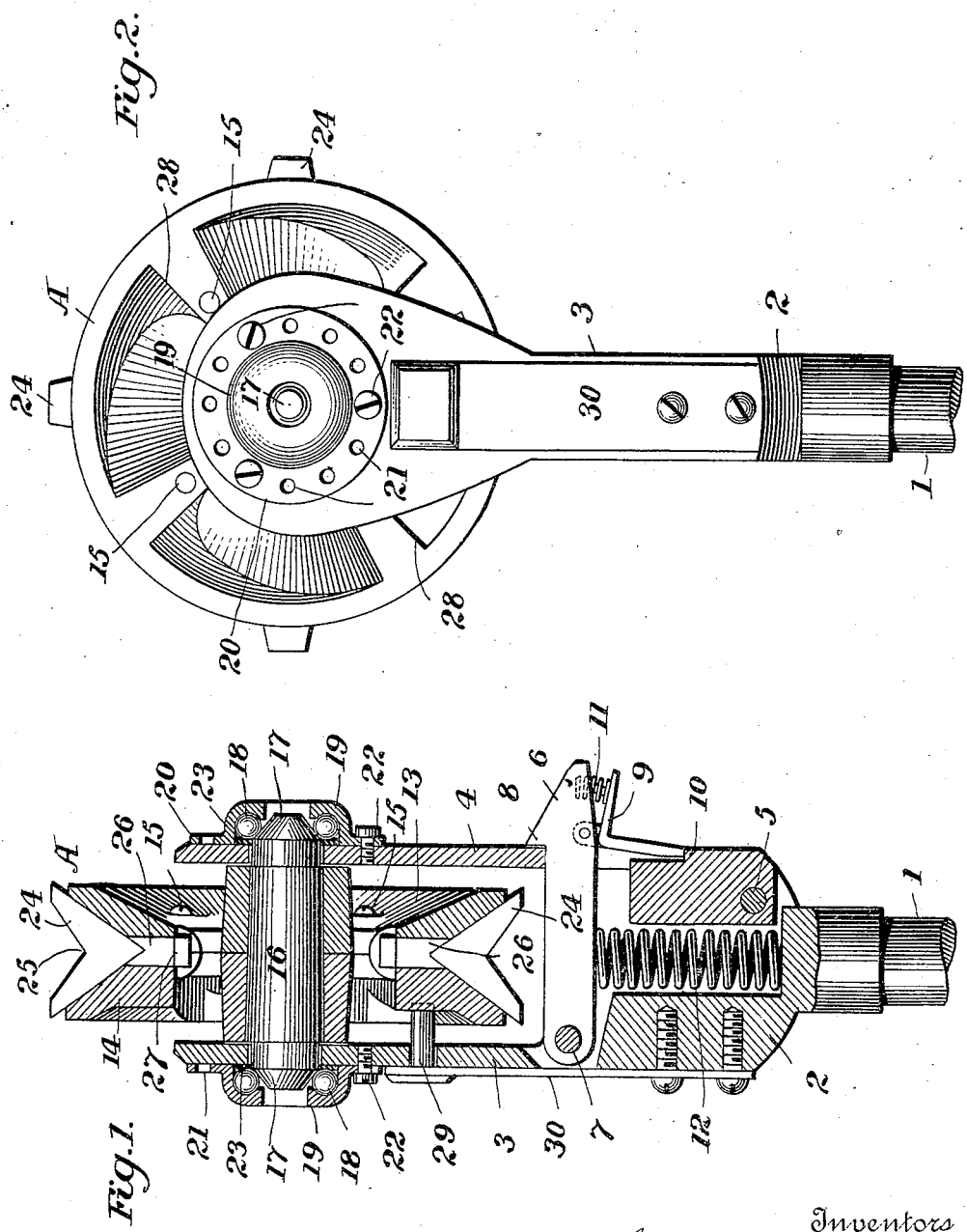

No. 870,080. PATENTED NOV. 5, 1907.
C. P. & H. C. BOSTIAN.
TROLLEY WHEEL.
APPLICATION FILED JULY 15, 1907.
2 SHEETS—SHEET 2.
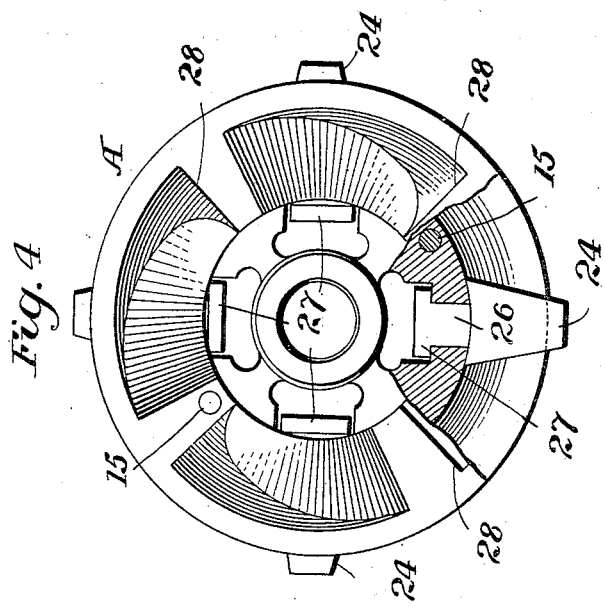
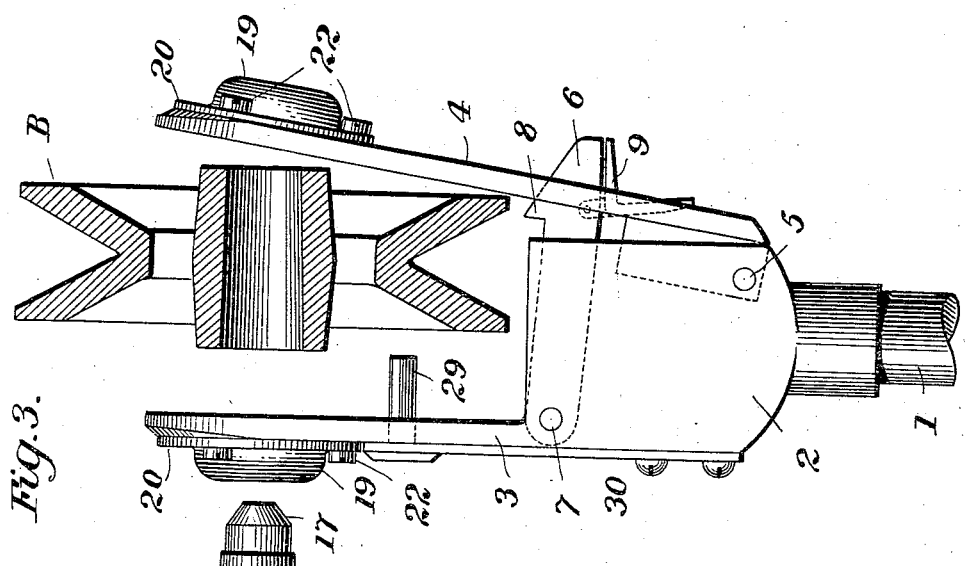
Witnesses
J. G. Stinkel
B. C. Rust
Inventors
Charles P. Bostian
Homer C. Bostian
By Foster Freeman Watson & Coit
Attorneys

UNITED STATES PATENT OFFICE.

CHARLES P. BOSTIAN AND HOMER C. BOSTIAN, OF MILTON, PENNSYLVANIA, ASSIGNORS OF ONE-THIRD TO HARRY R. FRICK, OF MILTON, PENNSYLVANIA.

TROLLEY-WHEEL.

No. 870,080.

Specification of Letters Patent.

Patented Nov. 5, 1907.

Application filed July 15, 1907. Serial No. 383,801.

*To all whom it may concern:*

Be it known that we, CHARLES P. BOSTIAN and HOMER C. BOSTIAN, citizens of the United States, and residents of Milton, Northumberland county, State of Pennsylvania, have invented certain new and useful Improvements in Trolley-Wheels, of which the following is a specification.

This invention relates to improvements in trolleys for electric railways and more particularly to the construction of the harp in which the trolley wheel is mounted, the bearings for the trolley wheel, the means for locking the wheel in its bearings, a special construction of trolley wheel having means for breaking up and removing ice from the conductor, and minor improvements which will be particularly pointed out in the following specification.

In the accompanying drawings: Figure 1 is a central sectional view of a trolley harp and wheel embodying the present invention; Fig. 2 is a left side view of the same; Fig. 3 is a view showing the harp open and the wheel and axle detached, and Fig. 4 is a side view of the trolley wheel shown in Fig. 1, partly broken away.

Referring to the drawings, 1 indicates the shank of a trolley harp, which is preferably cylindrical and adapted for insertion into the end of a trolley pole; 2 indicates the base of the harp, 3 the fixed side plate, and 4 a movable sideplate which is hinged to the base by the pivot pin 5.

I provide a latch for holding the sideplates in parallel position, as shown in Fig. 1, and means for locking the latch against accidental displacement, thus very securely holding the trolley wheel in its bearings.

As shown in Figs. 1 and 3, 6 indicates a latch which is pivoted at 7 to the fixed side plate 3 and which has a shoulder 8 adapted to engage the movable sideplate, the latch extending through an opening in said movable sideplate. Connected with the latch is a spring lock 9 which, as shown, is in the form of a right angled plate pivotally connected near its angle with the latch
6. One end of this lock 9 is adapted to engage the shoulder 10 on the movable sideplate and upon the other end a spring 11 bears to throw the lock into engagement with the said shoulder. The spring 11 is interposed between the arm of the locking plate 9 and the latch 6.
By compressing the spring 11 the lock is disengaged from the shoulder 10 and the latch 6 may then be withdrawn from engagement with the sideplate 4, permitting the sideplate 4 to be moved away from the plate 3, as shown in Fig. 3. The latch 6 is normally pressed into engagement with the sideplate 4 by a spring 12 which is preferably situated in a socket in the base 2.

I preferably provide the trolley wheel with ball bearings and with a removable axle having cones coöperating with the ball bearings, whereby the axle may be renewed when worn, the bearings being also removable and renewable. The wearing parts of my improved trolley are thus renewable and the life of the trolley may be prolonged with a minimum of expense.

In the drawing, A indicates a special construction of trolley wheel adapted for clearing the conducting wire of ice and snow, and B the trolley wheel for ordinary service. Either of these trolley wheels may be used with my improved harp.

I shall first describe the trolley A, which preferably consists of two sections 13, 14, divided by a plane through the middle of the wheel at right angles to the axis and detachably connected by screws 15 or other suitable devices. The trolley wheels A and B each have tapered axle openings adapted to receive the tapered axles 16. The axles 16, when in operative position, pass through the sides 3, 4 of the harp and their coned ends 17 engage ball bearings 18 supported on the harp. The balls of each bearing run in a race in the cup 19 located on and connected to the outside of the harp. The cups 19 have flanges 20 which are preferably provided with a series of holes 21 and the cups are connected to the sides of the harp by screws 22 passing through said holes. The holes 21 are so spaced that the cups may be adjusted to different positions about the axis of the trolley axle to present new wearing surfaces to the balls. The cups 19 are non-adjustable longitudinally of the trolley axis and therefore the bearings never bind in the cones. Within the ball cups are rings 23 which prevent the balls from dropping out when the cones are withdrawn from the bearings. My improved trolley harp is thus provided with ball bearings which are adjustable and renewable, and from which the balls cannot separate when the trolley wheel is being replaced. The trolley wheel A, shown in Figs. 1, 2 and 4, has a plurality of teeth 24 seated in the groove of the wheel and each provided with a notch or V-shaped recess 25 to engage the conductor. Means are provided for securely connecting the teeth 24 with the wheel. As shown, each tooth has a shank 26 extending through the flange of the wheel and provided with a head 27 which prevents the withdrawal of the tooth. The teeth are inserted in suitable openings in the wheel sections 13, 14, and locked in place by clamping the sections together, as previously described. The section 14 of the trolley wheel A is provided on its side face with a plurality of ratchet teeth 28 which have abrupt faces at one side and inclined faces at the other and which coöperate with the pin or pawl 29 carried by a spring 30 securely connected with the head 2, the pin or pawl 29 extending through an opening in the sideplate 3. It will be evident that the pawl 29 will permit the trolley A to rotate in one direction only. When rotating in this direction the pin rides up the inclined faces of the teeth 28 and jumps from tooth to tooth over the abrupt faces. When an attempt is made to rotate the wheel in the opposite direction the pawl 29 engages one of the teeth 28 and stops the rotation.

The operation of the trolley A is as follows: In breaking sleet or ice from the conductor it is customary to run two cars coupled together. I place on the forward car a trolley A which is reversed in its bearings from the position shown in Fig. 1; that is, the side 13 of the trolley is turned toward the pawl 29, but is not engaged by said pawl and the trolley may therefore turn freely. The shock of the teeth striking the wire or conductor will break the ice and remove a large proportion of it. To remove the remaining portion of the ice, I provide the second car with a trolley wheel fitted to its harp, as shown in Fig. 1, and running in the proper direction to be stopped from rotating by the pawl 29. The trolley wheel is thus locked with one of the teeth 24 against the wire and said tooth acts as a scraper to remove the remaining ice or sleet from the wire. As soon as the wires are clear, the sleet removing wheels A may be removed from the trolley harps and surface wheels, such as B, may be substituted. Each wheel may be provided with a separate axle, but the same axles may be used for the wheels A and B, if desired.

It will be evident that other means of locking the trolley against rotation to make it act as a scraper may be substituted, and that various other changes within the province of an ordinary mechanic may be made without departing from the spirit of the invention.

Having described the invention, what I claim and desire to secure by Letters Patent is:

1. In a trolley, a harp comprising a base and two sideplates, one of which is hinged to the base, a latch for holding the hinged sideplate in operative position, a spring for yieldingly closing the latch, and means for positively locking the latch when closed.

2. In a trolley, a harp comprising a base and two sideplates, one of which is hinged to the base, a spring latch for holding the hinged sideplate in operative position, and means for positively locking the latch in operative position, said means consisting in a part hinged to the latch and coöperating with a shoulder on the movable sideplate.

3. In a trolley, a harp comprising a base and two sideplates, one of which is hinged to the base, a spring latch for holding the hinged sideplate in operative position, means for positively locking the latch in operative position, said means consisting in a part hinged to the latch and coöperating with a shoulder on the movable sideplate, and a spring for normally holding said part in engagement with said shoulder.

4. In a trolley, a harp comprising a base, a sideplate fixed to said base, a second sideplate hinged to said base, a latch pivotally connected with the fixed sideplate and passing through and engaging the hinged sideplate, and a lock for the latch consisting in a part connected with the latch and adapted to normally engage a shoulder on the movable sideplate when the said sideplate is in operative position.

5. In a trolley, a harp comprising a base, a fixed sideplate, a relatively movable sideplate, a latch connecting the base with the movable sideplate, a spring located in a socket in said base and bearing upon said latch, and means for positively locking the latch against displacement when the movable sideplate is in operative position.

6. In a trolley, the combination with a fixed sideplate of a relatively movable sideplate, said plates having oppositely disposed openings to receive the axle of a trolley wheel, in combination with a trolley wheel having an axle adapted to pass through said openings and adapted to engage ball bearings on the outside of the sideplates, and a ball cup connected to the outside of each sideplate, each of said ball cups being provided with a series of balls and with means for retaining said balls in the cups when the axle is withdrawn from its bearings, the said ball cups being adjustable about the trolley axis and non-adjustable longitudinally thereof.

7. In a trolley, a wheel provided with teeth on its periphery for engaging the conductor in combination with the harp in which the wheel is mounted, and means for locking the wheel against rotation, for the purpose set forth.

8. In a trolley, a wheel provided with teeth on its periphery for engaging the conductor in combination with the harp in which the wheel is mounted and a pawl connected with the harp and adapted to engage and lock the wheel against rotation, for the purpose set forth.

9. In a trolley, a wheel provided with a series of teeth on its periphery and having on one side means for preventing rotation of the trolley, the said trolley being reversible in its bearings, for the purpose set forth.

10. In a trolley, the combination with a harp and a pawl thereon of a wheel having teeth on one side adapted to coöperate with the pawl to lock the wheel, the said wheel being reversible in the harp, for the purpose set forth.

11. In a trolley, the combination with a wheel having a series of teeth on its periphery and a series of ratchet teeth on one side face, of a harp having bearings for the wheel, and a spring pressed pawl connected with the harp and adapted to engage the ratchet teeth on the side wheel.

12. In a trolley, a wheel consisting of two parts meeting in a plane at right angles to the axis of the wheel, and a series of teeth projecting radially from the periphery of the wheel and having shanks engaged and locked between the two parts of the wheel, and means for connecting the parts of the wheel.

In testimony whereof we affix our signatures in presence of two witnesses.

CHARLES P. BOSTIAN.
HOMER C. BOSTIAN.

Witnesses:
MAY E. SEILER,
FRANK G. REDCAY.